United States Patent
Sudhakaran et al.

(10) Patent No.: US 10,476,699 B2
(45) Date of Patent: Nov. 12, 2019

(54) VLAN TO VXLAN TRANSLATION USING VLAN-AWARE VIRTUAL MACHINES

(71) Applicant: HEWLETT PACKARD ENTERPRISE DEVELOPMENT LP, Houston, TX (US)

(72) Inventors: Sonu Sudhakaran, Bangalore (IN); Raghuveer K V Shenoy, Bangalore (IN); Sarada A, Bangalore (IN); John Joseph McCann, III, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/885,370

(22) Filed: Jan. 31, 2018

(65) Prior Publication Data

US 2019/0238365 A1    Aug. 1, 2019

(51) Int. Cl.
*H04L 12/28* (2006.01)
*H04L 12/46* (2006.01)
(Continued)

(52) U.S. Cl.
CPC ...... *H04L 12/4633* (2013.01); *G06F 9/45558* (2013.01); *H04L 12/4666* (2013.01);
(Continued)

(58) Field of Classification Search
CPC . H04L 41/08; H04L 41/0823; H04L 41/0836; H04L 41/32; H04L 45/42
(Continued)

(56) References Cited

U.S. PATENT DOCUMENTS 9,331,946 B2 * 5/2016 Okita .................. H04L 47/125
9,419,897 B2 * 8/2016 Cherian ............... H04L 45/745
(Continued)

FOREIGN PATENT DOCUMENTS

CN    107018058 A    8/2017

OTHER PUBLICATIONS

Cisco, "Cisco Virtual Topology System: Data Center Automation for Next-generation Cloud Architectures White Paper," Document ID: 1493230744859446, Apr. 26, 2017, pp. 1-14 [online], Retrieved from the Internet on Dec. 8, 2017 at URL: <cisco.com/c/en/us/products/collateral/cloud-systems-management/virtual-topology-system/white-paper-c11-734904.html>.
(Continued)

*Primary Examiner* — Dmitry Levitan
(74) *Attorney, Agent, or Firm* — Hewlett Packard Enterprise Patent Department

(57) ABSTRACT

In one example, a virtual local area network (VLAN) tagged packet may be received from a first virtual machine (VM) running on a first host via a port group that spans across hosts by a first virtual bridge of a first VLAN-aware VM. The first VLAN-aware VM may run on the first host. The VLAN tagged packet from the first VM may be translated to a virtual extensible local area network (VXLAN) encapsulated packet by the first virtual bridge based on a network property of a VM port of the first VM. The VXLAN encapsulated packet may be transmitted to a second VM running on a second host by the first virtual bridge via a VXLAN tunnel endpoint (VTEP) provided by the first VLAN-aware VM.

18 Claims, 5 Drawing Sheets

(51) Int. Cl.
  *H04L 12/24* (2006.01)
  *G06F 9/455* (2018.01)
  *H04L 29/12* (2006.01)

(52) U.S. Cl.
  CPC ...... *H04L 41/0806* (2013.01); *H04L 41/0893* (2013.01); *H04L 61/2592* (2013.01); *G06F 2009/4557* (2013.01); *G06F 2009/45595* (2013.01); *H04L 61/6022* (2013.01)

(58) Field of Classification Search
  USPC .......................... 370/254, 270, 400, 409, 422
  See application file for complete search history.

(56) References Cited

U.S. PATENT DOCUMENTS

| | | | | |
|---|---|---|---|---|
| 9,547,516 B2* | 1/2017 | Thakkar | .............. | G06F 9/45558 |
| 9,559,896 B2 | 1/2017 | Patwardhan et al. | | |
| 9,654,300 B2* | 5/2017 | Pani | ........................ | H04L 12/18 |
| 9,692,698 B2* | 6/2017 | Cherian | ................ | H04L 45/745 |
| 9,768,980 B2* | 9/2017 | Subramaniyam | ... | H04L 12/4625 |
| 9,781,037 B2* | 10/2017 | Nellikar | ................ | H04L 45/745 |
| 10,033,595 B2* | 7/2018 | Sif | ....................... | G06F 9/45558 |
| 10,135,687 B2* | 11/2018 | Kashyap | ............. | H04L 41/0893 |
| 10,205,657 B2* | 2/2019 | Chang | ................. | H04L 12/4633 |
| 2015/0063166 A1 | 3/2015 | Sif et al. | | |
| 2017/0126552 A1* | 5/2017 | Pfaff | .................... | G06F 16/2282 |
| 2018/0351791 A1* | 12/2018 | Nagarajan | ............... | H04L 41/08 |
| 2019/0020627 A1* | 1/2019 | Yuan | .................... | G06F 9/45558 |

OTHER PUBLICATIONS

Pica8 Inc., "OpenStack VXLAN VTEP Gateway with Pica8 and Midokura," Jun. 4, 2015, pp. 1-14.

OpenStack Docs, "VLAN Aware VM", available online at <https://specs.openstack.org/openstackineutron-specs/specs/newton/vlan-aware-vms.html>, Apr. 20, 2016, 9 pages.

HPE Helion, "HPE Helion OpenStack 3.0 Complete Documentation", available online at <https://support.hpe.com/hpsc/doc/public/display?docLocale=en_US&docId=emr_na-a00041882en_us&withFrame>, Nov. 14, 2017, 1276 pages.

"VMware NSX Network Virtualization and Security Platform", available online at <https://web.archive.org/web/20170615152504/http://www.vmware.com/in/products/nsx.html>, Jun. 15, 2017, 11 pages.

"OpenDay Light" available online at <https://web.archive.org/web/20180129103609/https://www.opendaylight.org/>, Jan 29, 2018, 5 pages.

\* cited by examiner

VLAN TO VXLAN TRANSLATION USING VLAN-AWARE VIRTUAL MACHINES

BACKGROUND

Data centers may include multiple hosts where the hosts, in turn, each execute multiple virtual machines (VMs). The VMs may belong to virtual layer-2 segments that span across a physical layer-3 data center network using an overlay technology. Based on a design of the data center and/or requirements of the applications executing on the VMs, data centers may limit/restrict private connectivity between hosts or communication between the VMs to maintain security and performance of the data center. When using the overlay technology, VMs in different layer-2 segments may not be able to communicate, i.e., a VM in the data center may not be able to communicate with (e.g., transmit packets to) another VM in the data center.

BRIEF DESCRIPTION OF THE DRAWINGS

Certain examples are described in the following detailed description and in reference to the drawings, in which.

DETAILED DESCRIPTION

Figure 1:
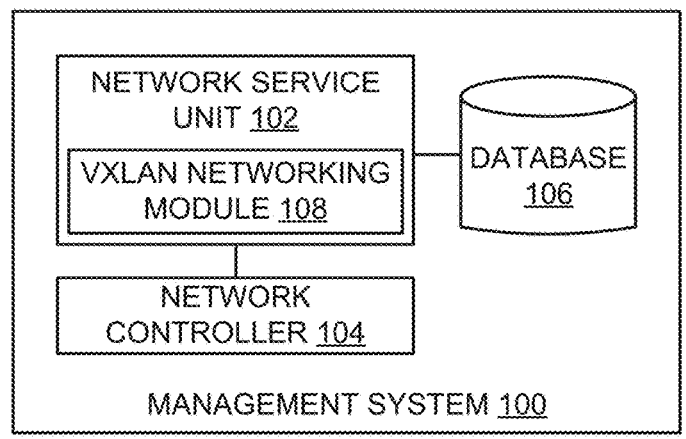
FIG. 1 is a block diagram of an example management system for translating and redirecting virtual extended local area network (VXLAN) traffic between VMs running on different hosts.

Data centers may include multiple hosts (e.g., servers), with each host executing multiple virtual machines (VMs). Virtual extended local area network (VXLAN) is a network virtualization scheme that overlays layer-2 over layer-3. VXLAN may use layer-3 multicast to support the transmission of multicast and broadcast traffic in the virtual network, while decoupling the virtual network from the physical infrastructure. In a virtual computing environment, VXLAN can extend the virtual network across a set of hosts, providing layer-2 connectivity among the hosted VMs. Each host may represent a VXLAN tunnel endpoint. In such cases, a VXLAN gateway device can be used to terminate the VXLAN tunnel and forward traffic to and from a physical network. For example, the VXLAN tunnel endpoint can be a virtual tunnel endpoint (VTEP) that maps a VXLAN network identifier (VNI) to a corresponding virtual local area network (VLAN).

In virtual computing environments, hosts/servers may be considered pristine and third-party components and packages may not be allowed on host operating systems. Supporting the VXLAN may include VTEPs to be created on each host for VXLAN tunnel termination, and a bridge program to implement the layer-2 flows to process packets. In addition, supporting the VXLAN may also need additional packages to create and manage the VTEPs for the VXLAN tunnel between the hosts in the data centers. VM may use an established VXLAN tunnel between the hosts to communicate to each other. However, installation of additional packages on hosts for supporting the VXLAN for VM networking may not be allowed. In such scenarios, users/customers may have to purchase additional licenses to support the VXLAN for VM networking, which can involve a significant cost.

Examples described herein may provide VXLAN communication between VMs running on different hosts using VLAN-aware VMs. A VLAN-aware VM may refer to a VM that can be executed on each host to provide VXLAN networking for the VMs running therein. In one example, a first VLAN-aware VM may be executed on a first host. Further, a VLAN tagged packet may be received from a first VM running on the first host by a first virtual bridge on the first VLAN-aware VM via a port group that spans across hosts. Further, the VLAN tagged packet from the first VM may be translated to a VXLAN encapsulated packet by the first virtual bridge based on a network property of a VM port of the first VM. Furthermore, the VXLAN encapsulated packet may be transmitted to a second VM running on a second host by the first virtual bridge via a VTEP provided by the first VLAN-aware VM.

Examples described herein may enable each host to support usage up to 4K private VLANs (PVLANs), where each PVLAN may map to a VNI. In this example, the PVLANs may be applied on the VM ports. Examples described herein may model the VM ports as sub-ports in a networking service (e.g., Neutron). The PVLAN may be provided as a part of sub-port definition in the networking service. In some examples, the VLAN-aware VMs may use the sub-ports and PVLAN information to program open flow rules in the virtual bridges.

Further, examples described herein may utilize a single port group in the virtual computing environment to boot the VMs, and VM network information may be provided as part of VM metadata. Furthermore, examples described herein may enable to implement micro-segmentation and process traffic between the VMs on the same network using open flow rules, thereby enabling to implement a stateful intra-network firewall. Also, examples described herein may be implemented in compliance with networking configuration and management standards, such as an open virtual switch database (OVSDB) management protocol.

Referring now to the figures, FIG. 1 is a block diagram of an example management system 100 for translating and redirecting VXLAN traffic between VMs running on different hosts. A VM may refer to a data computer node that operates with its own guest operating system (OS) on a host using at least a portion of the various resources of the host virtualized by virtualization software. Example virtualization software may be a hypervisor that includes the ability to create, execute, and/or, at least in part, manage VMs executing on the host. For example, hosting a VM may include, but not limited to, providing the resources assigned to the VM, scheduling time for the VM to use various physical hardware resources (e.g., a processor, memory, network resources, and the like), and translating instructions from the VM into instructions that are understood by the underlying physical hardware, operating system, and/or hypervisor of the host. Each VM is a complete execution environment, and the host provides a user interface over the network connection so that user inputs and outputs can be communicated between the user and the VM.

Example management system 100 may include a network service unit 102, a network controller 104, and a database 106. Further, network service unit 102 may include a VXLAN networking module 108. For example, network service unit 102, VXLAN networking module 108, and network controller 104 may be any combination of hardware and programming to implement the functionalities described herein. In some implementations, the programming may be processor executable instructions stored on a non-transitory machine-readable storage medium, and the hardware may include at least one processing resource to retrieve and/or execute those instructions.

In some implementations, the hardware and programming may be that of the management system 100 or can be of any computing device acting as the host that executes the VMs. Example processing resources may include a microcontroller, a microprocessor, central processing unit core(s), an application-specific integrated circuit (ASIC), a field programmable gate array (FPGA), and the like. Example non-transitory machine-readable medium may include random access memory (RAM), read-only memory (ROM), electrically erasable programmable read-only memory (EEPROM), flash memory, a hard disk drive, and the like. The term "non-transitory" does not encompass transitory propagating signals. Additionally or alternatively, network service unit 102, VXLAN networking module 108, and network controller 104 may include electronic circuitry or logic for implementing functionalities described herein.

Figure 2:
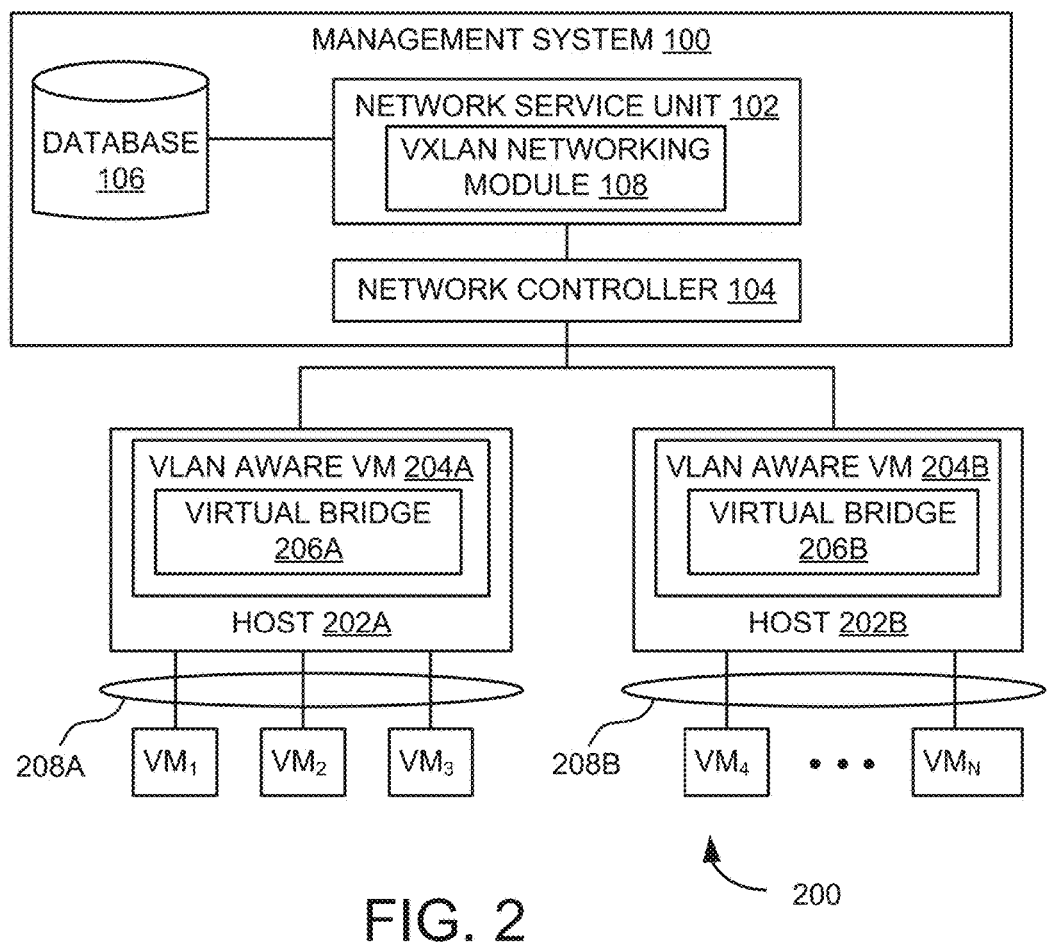
FIG. 2 is a block diagram of an example virtual computing environment, depicting virtual local area network (VLAN)-aware VMs to translate and redirect the VXLAN traffic between the VMs.
Figure 3:
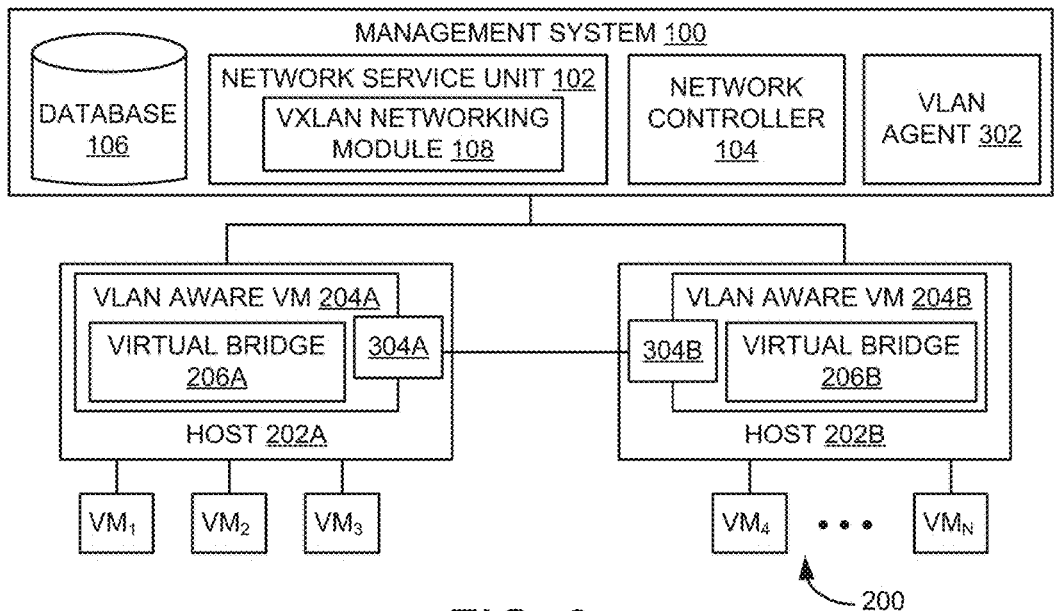
FIG. 3 is a block diagram of the example virtual computing environment of FIG. 2, depicting additional features.

During operation, VXLAN networking module 108 and network controller 104 may provide VXLAN communication between the VMs running on different hosts using VLAN-aware VMs as explained in FIGS. 2 and 3.

FIG. 2 is a block diagram of an example virtual computing environment 200, depicting VLAN-aware VMs 204A and 204B to translate and redirect the VXLAN traffic between the VMs (e.g., $VM_1$ to $VM_N$). As shown in FIG. 2, virtual computing environment 200 may include management system 100 and hosts 202A and 202B that are in communication with management system 100. Management system 100 may refer to a computing device or computer program (i.e., executing on a computing device) that provides some service to hosts 202A and 202B. Hosts 202A and 202B may refer to a hardware platform having compute and storage resources for executing the VMs. Management system 100 may connect to hosts 202A and 202B either directly or over a network (e.g., over a local-area network, wide-area network, wireless network, or the like). Host 202A and 202B may have associated VMs (e.g., $VM_1$ to $VM_N$) running therein. In the example shown in FIG. 2, virtual computing environment 200 is described using two hosts, however, virtual computing environment 200 can include any number of hosts, with each host executing at least one VM.

Further as shown in FIG. 2, management system 100 may include network service unit 102 and network controller 104 to implement the functionalities described herein. In one example, network service unit 102 may include VXLAN networking module 108. During operation, VXLAN networking module 108 may deploy a VLAN-aware VM on each of hosts 202A and 202B. The term "VLAN-aware VM" may refer to a VM that transmits and receives VLAN tagged frames/data over associated virtual network interface cards (vNICs). For example, each VM port associated with the VMs may be tagged with a VLAN at a virtual port. Further, the VMs may generate a packet with a VLAN tag which can be later processed by virtual bridges. As shown in FIG. 2, host 202A executes $VM_1$-$VM_3$ and VLAN-aware VM 204A, and host 202B executes $VM_4$-$VM_N$ and VLAN-aware VM 204B.

Further, VXLAN networking module 108 may deploy/execute virtual bridges 206A and 206B on VLAN-aware VMs 204A and 204B, respectively. Example virtual bridges 206A and 206B may include open virtual switch (OVS) bridges.

Furthermore, VXLAN networking module 108 may trunk VM ports associated with the VMs corresponding to each host into a logical port having a plurality of VLANs via respective VLAN-aware VMs. For example, VM ports associated with $VM_1$-$VM_3$ running on host 202A may be trunked into logical port 208A using VLAN-aware VM 204A, and VM ports associated with $VM_4$-$VM_N$ running on host 202B may be trunked into logical port 208B using VLAN-aware VM 204B. The terms "trunk" and "trunked" may refer to combining multiple VLANs into a single logical port to facilitate carrying VLAN tagged frames.

Also, VXLAN networking module 108 may create a trunk port for each VLAN-aware VM 204A and 204B in database 106. The term "trunk port" may refer to a port that allows more than one VLAN identifier. In one example, the trunk port may include a port associated with a VLAN-aware VM 204A or 204B that allows corresponding VLANs (i.e., VLAN tagged frames) from $VM_1$ to $VM_N$. The trunk port may represent a logical port that carries host local VLANs (i.e., PVLANs). The terms "VLAN" and "PVLAN" may be used interchangeably throughout the document.

Further, VXLAN networking module 108 may create a sub-port for each VM port corresponding to the trunk port in database 106. In one example, the trunk port can have more than one sub-port to carry the individual PVLANs. The sub-ports associated with the VM ports corresponding to a host may be associated to a trunk port associated with the host.

Also, VXLAN networking module 108 may create a new sub-port with a VLAN in an associated trunk port when a new VM is deployed on host 202A or 202B. Network service unit 102 may communicate a unique identifier associated with the trunk ports to respective one of virtual bridges 206A and 206B.

Further during operation, network controller 104 may control each virtual bridge to translate and redirect VXLAN traffic to/from the VMs (e.g., $VM_1$ to $VM_N$) using the trunk ports and the sub-ports. Example network controller 104 may be a software-defined network (SDN) controller or an open virtual network (OVN) driver. In one example, network controller 104 may identify VLAN-aware VMs 204A and 204B using the associated unique identifier and establish a relationship between network ports on VXLAN networks, the sub-ports, and the trunk ports. For example, a network port may be created, for each vNIC associated with the VMs, in database 106 for translating VLAN tagged data (e.g., frames that are tagged with VLAN identifiers) to VXLAN encapsulated data in the VXLAN networks.

Network controller 104 may apply open flow rules to virtual bridges 206A and 206B to translate the VXLAN traffic to/from the VMs. In one example, network controller 104 may route the VXLAN traffic to/from the VMs based on the established relationship and applied open flow rules via VTEPs provided by VLAN-aware VMs 204A and 204B, to carry the VXLAN traffic between hosts 202A and 202B in the VXLAN networks.

FIG. 3 is a block diagram of example virtual computing environment 200 of FIG. 2, depicting additional features. For example, similarly named elements of FIG. 3 may be similar in structure and/or function to elements described with respect to FIG. 2. As shown in FIG. 3, management system 100 may include a VLAN agent 302. For example, VLAN agent 302 may be any combination of hardware and programming to implement the functionalities described herein. VLAN agent 302 can be implemented as a part of management system 100 or can be implemented as part of at least one of hosts 202A and 202B. In other examples, network service unit 102, network controller 104, and VLAN agent 302 can also be provided in a VM or virtual application that can run on any host 202A or 202B and can be provided to a user/customer through a graphical user interface as a part of a management application.

During operation, VLAN agent 302 may assign a VLAN identifier for each VM port corresponding to the VMs running on each host 202A and 202B. In one example, VXLAN networking module 108 may create the trunk port for each VLAN-aware VM 204A and 204B such that each trunk port can allow more than one VLAN identifier.

Further as shown in FIG. 3, VLAN-aware VMs 204A and 204B may provide VTEPs 304A and 304B, respectively, to originate or terminate VXLAN tunnels between hosts 202A and 202B in a cluster. In the examples shown in FIG. 3, network controller 104 may route the VXLAN traffic to/from the VMs based on the established relationship and applied open flow rules via VTEPs 304A and 304B provided by VLAN-aware VMs 204A and 204B, respectively, to carry the VXLAN traffic between hosts 202A and 202B.

In one example, VXLAN may implement a network virtualization by performing encapsulation on a layer-3 network. Further, VXLAN encapsulation may be completed by using VTEPs 304A and 304B. In one example, VTEPs 304A and 304B may be provided by VLAN-aware VMs 204A and 204B, respectively. A tunnel may be established between VTEPs 304A and 304B, and data of a virtual network may be transmitted through the tunnel. Thus, examples described herein may use VLAN-aware VMs 204A and 204B from a networking service (e.g., Neutron OpenStack) to deliver VXLAN networking for the VMs (i.e., $VM_1$ to $VM_N$).

Figure 4:
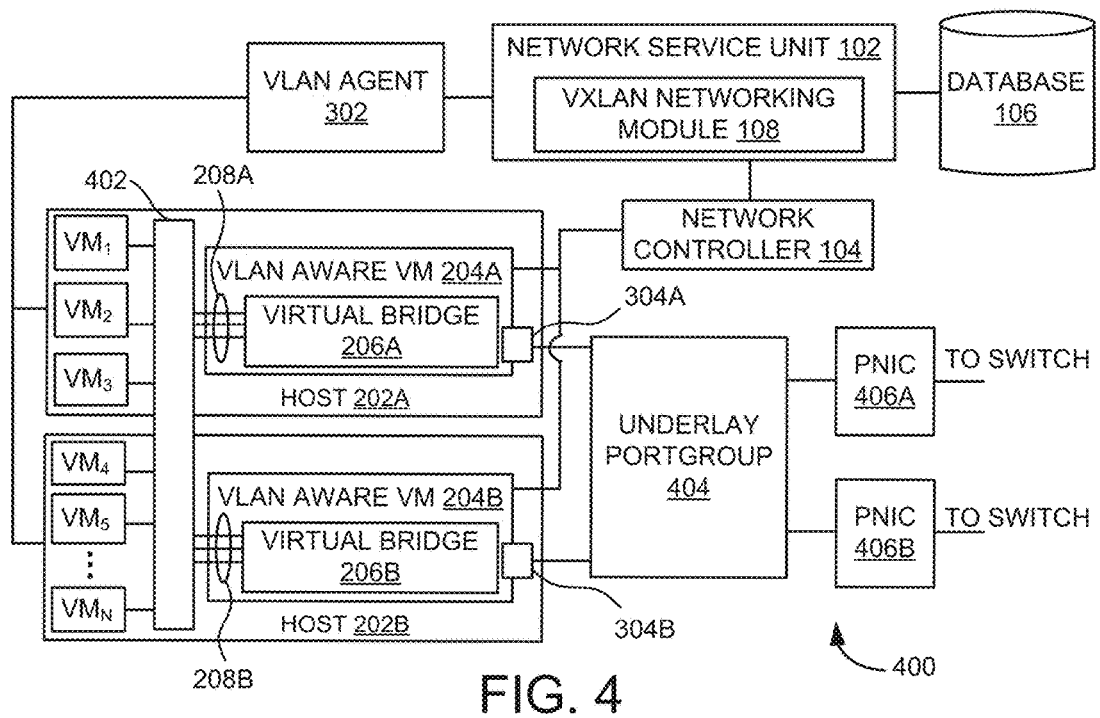
FIG. 4 is an architectural diagram of the example virtual computing environment of FIG. 2, for implementing VXLAN communication between the VMs using the VLAN-aware VMs.

FIG. 4 is an example architectural diagram of a virtual computing environment 400 (e.g., virtual computing environment 200 of FIG. 2) for implementing VXLAN communication between VMs (e.g., $VM_1$ to $VM_N$) using the VLAN-aware VMs 204A and 204B. VLAN-aware VMs 204A and 204B running on hosts 202A and 202B may form a mesh of VXLAN tunnels to support network communication between the VMs on the same network but on different hosts.

As shown in FIG. 4, VM ports associated with VMs (e.g., $VM_1$ to $VM_N$) may be connected to a port group 402. For example, port group 402 may represent a layer-2 network object. Example port group may have associated VLAN identifiers. In one example, VLAN agent 302 may generate and assign a unique VLAN identifier for each VM port per host. In one example, network service unit 102 may include VXLAN networking module 108. For each host, VXLAN networking module 108 may trunk the VM ports from port group 402 into a logical port (e.g., 208A and 208B) with many VLANs via a respective VLAN-aware VM (e.g., 204A or 204B) running on hosts 202A and 202B. In the example shown in FIG. 4, VM ports associated with $VM_1$-$VM_3$ running on host 202A may be trunked into logical port 208A using VLAN-aware VM 204A and VM ports associated with $VM_4$-$VM_N$ running on host 202B may be trunked into logical port 208B using VLAN-aware VM 204B.

Further, VXLAN networking module 108 may create a trunk port (e.g., neutron trunk port) for each VLAN-aware VM 204A and 204B in database 106. For example, a first trunk port may be created for VLAN-aware VM 204A and a second trunk port may be created for VLAN-aware VM 204B. In one example, VLAN-aware VMs 204A and 204B may trunk the traffic from port group 402 using a trunk port-group in virtual computing environment 400 such that VM traffic (e.g., VLAN tagged data) can flow through virtual bridges 206A and 206B in VLAN-aware VMs 204A and 204B. Furthermore, VXLAN networking module 108 may create a sub-port for each VLAN on the trunk ports (e.g., the first trunk port and the second trunk port).

Also, a unique identifier (e.g., universally unique identifier) of the trunk port may be communicated to corresponding virtual bridges 206A and 206B running in VLAN aware VMs 204A and 204B, respectively. In some examples, network service unit 102 and/or network controller 104 may identify each VLAN-aware VM/trunk port in a virtual bridge to program flows using an associated unique identifier. Also, any new VM created on host 202A or 202B running VLAN-aware VMs 204A and 204B may result in creation of a sub-port in an associated trunk with a PVLAN. In one example, the logical port may represent VMs on that host as one "logical" VM using, for instance, a Neutron application programming interface (API) of an associated VLAN aware VM. Each VLAN may be a separate sub-port (e.g., Neutron sub-port) on a single trunk. Further, a logical trunk interface representing the VLANs may be programmed in a corresponding virtual bridge 206A or 206B as a bridge port.

Furthermore, VXLAN networking module 108 may establish a relationship/mapping between network ports on a VXLAN network, the sub-ports with associated PVLANs, and the trunk ports.

Further, network controller 104 may control virtual bridge 206A and 206B running on VLAN-aware VMs 204A and 204B to translate VLAN traffic to VXLAN traffic based on the established relationship and the open flow rules. Furthermore, network controller 104 may send the VXLAN traffic to VTEPs 304A and 304B provided by VLAN-aware VMs 204A and 204B, which may carry the VXLAN traffic to other VMs. Example network controller 104 may include an open SDN controller. For example, network controller 104 may control virtual bridges 206A and 206B on VLAN aware VMs 204A and 204B and applies rules (e.g., OpenFlow® rules) to translate and redirect any ingress/egress traffic to/from the VMs.

Alternatively, Neutron with an open virtual network (OVN) driver can be used to program virtual bridges 206A and 206B, in compliance with the OVSDB. For example, open flow rules in virtual bridges 206A and 206B may decide whether to allow, reject, or modify the VLAN packets. In some examples, open flow rules may be managed by network controller 104 and rules set by a cloud administrator, for example, for fine grained access control. Also, examples described herein may be implemented in compliance with networking configuration and management standards, such as an OVSDB management protocol. For example, OVSDB may refer to a protocol designed to manage virtual bridge (e.g., open virtual switch (OVS)) implementations. Open flow rules may refer to a protocol used to program flows into virtual bridges 206A and 206B.

In some examples, network service unit 102 and network controller 104 can push open flow rules to virtual bridges 206A and 206B running in VLAN-aware VMs 204A and 204B to translate PVLAN to VXLAN before the VXLAN traffic is sent out to associated VTEPs 304A and 304B. Further, VTEPs 304A and 304B may carry the VXLAN traffic to reach VMs on other hosts on VXLAN networks. For example, VTEP 304A may route the VXLAN traffic associated with the VMs (i.e., $VM_1$ to $VM_3$) provided by VLAN-aware VM 204A to a physical switch via underlay port group 404 and physical network interface card (PNIC) 406A. Similarly, VTEP 304B may route the VXLAN traffic associated with the VMs (i.e., $VM_4$ to $VM_N$) provided by VLAN-aware VM 204B to a physical switch via underlay port group 404 and PNIC 406B.

In one example, each of network service unit 102, VXLAN networking module 108, network controller 104, and VLAN agent 302 can be any combination of hardware and programming to implement the functionalities described herein. Management system (e.g., management system 100 of FIG. 1) may include computer-readable storage medium comprising (e.g., encoded with) instructions executable by a processor to implement functionalities described herein in relation to FIGS. 1-4. In some examples, the functionalities described herein in relation to instructions to implement functions of components of the management system and any additional instructions described herein in relation to storage medium, may be implemented as engines or modules comprising any combination of hardware and programming to implement the functionalities of the modules or engines. In examples described herein, the processor may include, for example, one processor or multiple processors included in a single computing device or distributed across multiple computing devices.

Figure 5:
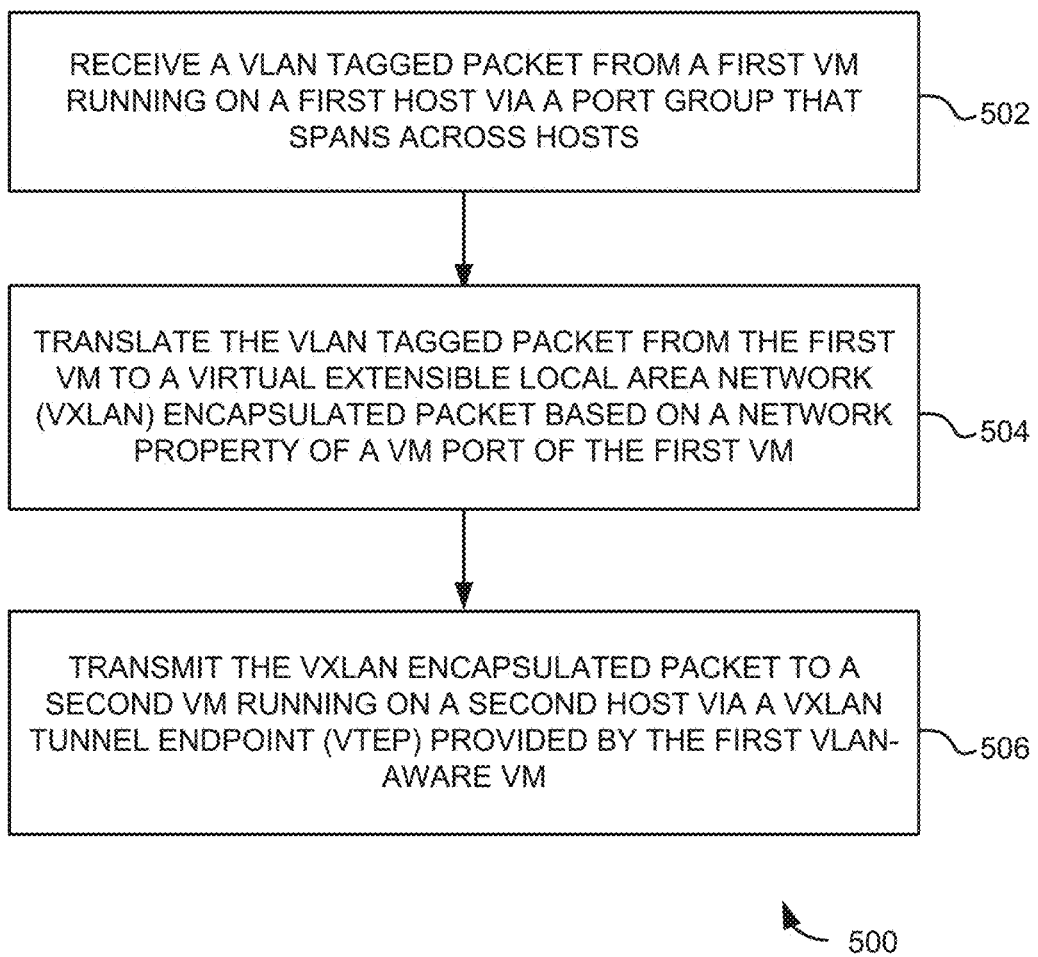
FIG. 5 is a flowchart of an example method for translating and transmitting a VXLAN encapsulated packet from a first VM to a second VM via a first VLAN-aware VM.

FIG. 5 is a flowchart of an example method 500 for translating and transmitting VXLAN encapsulated packet from a first VM to a second VM via a first VLAN-aware VM. Method 500 may be described below as being executed or performed by a system, for example, management system 100 of FIG. 1. In various examples, method 500 may be performed by hardware, programming, or some combination thereof. Other suitable systems and/or computing devices may be used as well. Method 500 may be implemented in the form of executable instructions stored on at least one machine-readable storage medium of the system and executed by at least one processor of the system. Alternatively or in addition, method 500 may be implemented in the form of electronic circuitry (e.g., hardware). In alternate examples of the present disclosure, one or more blocks of method 500 may be executed substantially concurrently or in a different order than shown in FIG. 5. In alternate examples of the present disclosure, method 500 may include more or fewer blocks than are shown in FIG. 5. In some examples, one or more of the blocks of method 500 may, at certain times, be ongoing and/or may repeat.

At 502, a VLAN tagged packet from a first VM running on the first host may be received by a first virtual bridge on a first VLAN-aware VM running on a first host via a port group. The port group may span across a plurality of hosts. In one example, the VM port associated with the first VM may be connected to the port group that spans across the hosts in a virtual computing environment.

At 504, the VLAN tagged packet from the first VM may be translated to a VXLAN encapsulated packet by the first virtual bridge based on a network property of a VM port of the first VM. For example, the network property of the VM port may be based on a networking service that delivers networking-as-a-service in a virtual computing environment. Example networking service may include a Neutron OpenStack.

In one example, a trunk port may be created in a database to represent a logical trunk for the first VLAN-aware VM on the first host. The logical trunk may allow VLANs and deliver VLAN tagged packets from VM ports to the first virtual bridge. Further, a sub-port having an associated private VLAN may be created for each VM port corresponding to the trunk port. Furthermore, the sub-ports and the trunk port may be mapped with network ports on VXLAN networks. Also, open flow rules may be programmed in the first virtual bridge based on the sub-ports and the private VLANs by a network controller of an SDN. In one example, the open flow rules may be programmed in the virtual bridge in compliance with an OVSDB management protocol. In this example, the VLAN tagged packet from the first VM may be translated to the VXLAN encapsulated packet based on the mapping and the programmed open flow rules.

At 506, the VXLAN encapsulated packet may be transmitted to a second VM running on a second host by the first virtual bridge via a VTEP provided by the first VLAN-aware VM. In one example, a second VLAN-aware VM may be executed on the second host. Further, the VXLAN encapsulated packet may be translated to the VLAN tagged packet by a second virtual bridge on the second VLAN-aware VM. Furthermore, the translated VLAN tagged packet may be transmitted/forwarded to the second VM by the second virtual bridge. An example network traffic flow between the VMs may be explained in FIG. 6.

Figure 6:
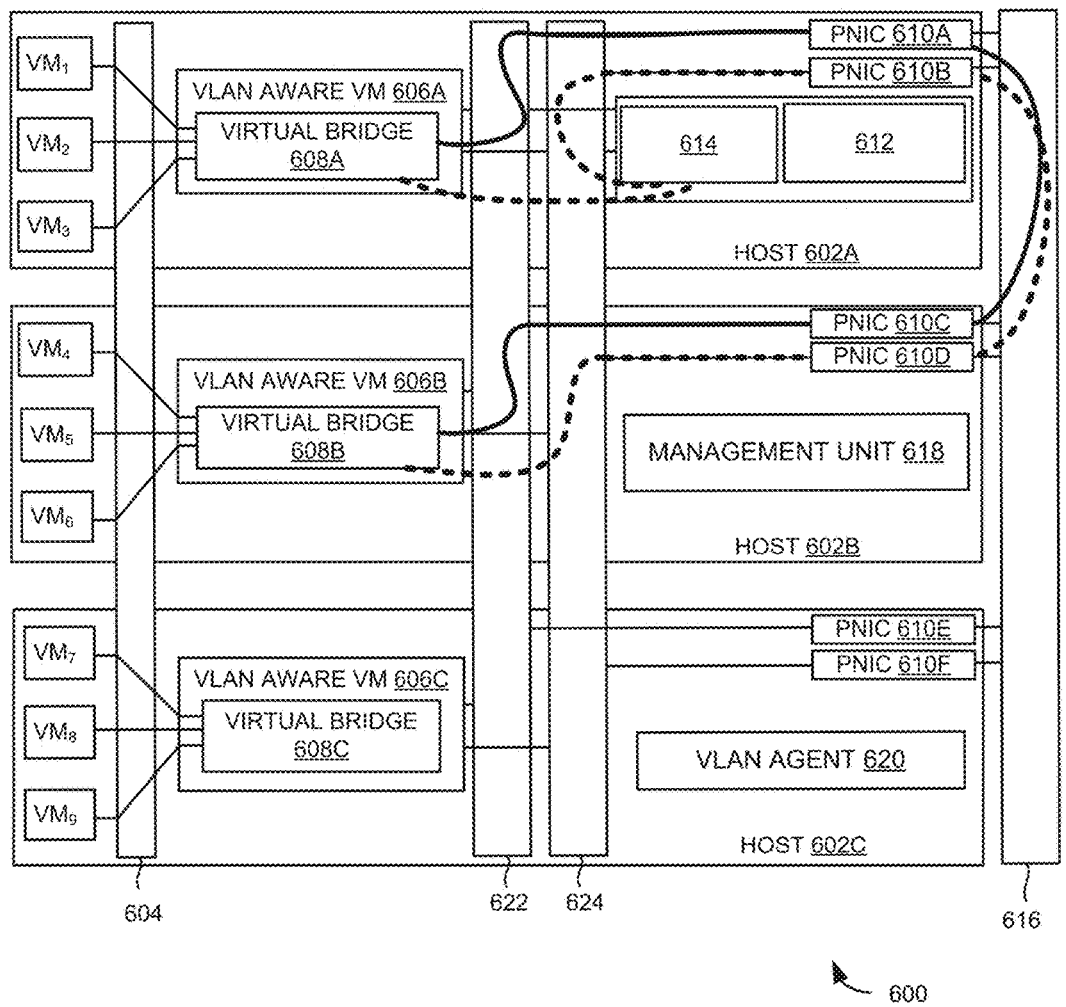
FIG. 6 is a schematic diagram of an example system, depicting an example network traffic flow between the VMs running on different hosts.

FIG. 6 is a schematic diagram of an example system 600, depicting an example network traffic flow between the VMs running on different hosts. Particularly, FIG. 6 may depict a logical packet flow between $VM_1$ and $VM_4$ belonging to a same network but hosted on two different hosts 602A and 602B, respectively. In this example, hosts 602A, 602B, and 602C may execute $VM_1$-$VM_3$, $VM_4$-$VM_6$, and $VM_7$-$VM_9$, respectively. In this example, $VM_1$ and $VM_4$ ports may be randomly selected private VLANs (e.g., from un-used range 1-4094), say VLAN-1027 and VLAN-1028, respectively. As shown in FIG. 6, $VM_1$ to $VM_9$ may be connected to a port group 604. Example port group may include a distributed port group that spans across hosts 602A to 602C in a cluster. Port group 604 may not have any uplink, and VLAN-aware VMs 606A-606O may trunk the traffic on port group 604.

As shown in FIG. 6, each host 602A-602C may run respective VLAN-aware VMs 606A-606O for terminating VXLAN traffic using associated VTEPs. Further, trunk ports (e.g., Neutron trunk ports) may be created to represent a logical trunk for each VLAN-aware VM 606A-606C on hosts 602A-602C. For example, the logical trunk on VLAN-aware VMs 606A-606O may allow the VLANs and deliver VLAN tagged packets from the VM ports to virtual bridges 608A to 608C on hosts 602A to 602C, respectively, for flow matching. An example command for creating a trunk is shown below:

OpenStack network create dummy_trunk_net
OpenStack subnet create --network dummy_trunk_net
  --subnet-range 1.1.1.0/24--prefix-length 24 dummy-_subnet
OpenStack port create --network dummy_trunk_net port0
OpenStack network trunk create --parent-port port0 trunk0

For each VM port, a sub-port may be created with an allocated private VLAN (e.g., VLAN-1027 and VLAN-1028) and added to the respective trunks as sub-ports using the following example command:

OpenStack network trunk set --subport port=vm-port-1, segmentation-type=vlan, segmentation-id=1027 trunk0 (for host 602A), and OpenStack network trunk set --subport port=vm-port-2, segmentation-type=vlan, segmentation-id=1028 trunk1 (for host 602B).

In one example, a network controller 614 may program a virtual bridge 608A on VLAN-aware VM 606A on host 602A to translate an incoming VLAN tagged packet from $VM_1$ to a VXLAN packet as determined by a network property (e.g., Neutron OpenStack property) of the VM port associated with $VM_1$ (e.g., using network service unit 612 and network controller 614). VXLAN encapsulated packet may be then forwarded to a VTEP of VXLAN tunnel on VLAN-aware VM 606A and reaches host 602B via PNICs 610A to 610D and a top-of-rack (TOR) switch 616 that is connected to hosts 602A and 602B. The TOR switch may route communications between physical servers in a rack unit and other network elements. In other examples, VTEPs may route the VXLAN traffic associated with $VM_1$ to PNIC 610A via underlay port group 622 and management port group 624. Similarly, PNICs 610E and 610F may be associated with host 602C to route VLAN traffic associated with the VMs (e.g., $VM_7$ to $VM_9$).

Further, on host 602B, reverse translation of the VXLAN encapsulated packet to VLAN packet may be performed in virtual bridge 608B, and then the VLAN packet may be received by $VM_2$. The open flow rules to encapsulate and de-capsulate the VLAN traffic may be managed by network controller 614 such as open SDN controller. In the examples shown in FIG. 6, network service unit 612 (e.g., network service unit 102 of FIG. 1) and network controller 614 (e.g., network controller 104 of FIG. 1) may be provided in a VM or virtual application that runs on host 602A. Further, in the examples shown in FIG. 6, a management unit 618 (e.g., to perform management functions for the VMs (i.e., $VM_1$ to $VM_9$) and hosts 602A-6020) may be provided in a VM or virtual application that runs on host 602B. Also, VLAN agent 620 (e.g., VLAN agent 302 of FIG. 3) may be provided in a VM or virtual application that runs on host 602C. However, network service unit 612, network controller 614, management unit 618, and VLAN agent 620 can also be implemented as a part of a management system.

Figure 7:
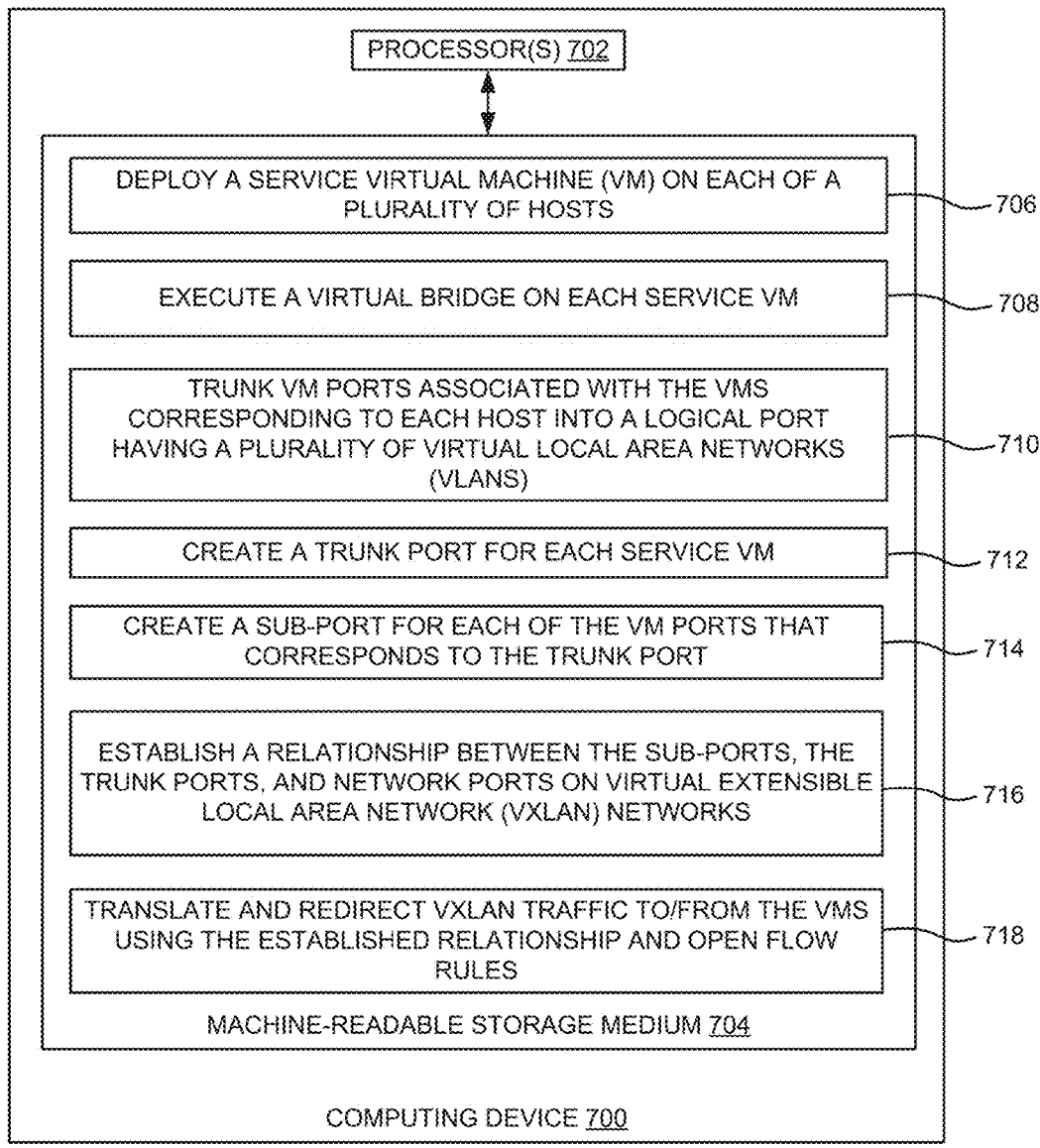
FIG. 7 is a block diagram of an example computing device, for translating and redirecting VXLAN traffic between VMs running on different hosts.

FIG. 7 is a block diagram of an example computing device 700, for translating and redirecting VXLAN traffic between VMs running on different hosts. In the example of FIG. 7, a computing device 700 may include a processor 702 and a machine-readable storage medium 704 (e.g., a non-transitory machine-readable storage medium). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 702 may be one or more central processing units (CPUs), microprocessors, and/or other hardware devices suitable for retrieval and execution of instructions stored in machine-readable storage medium 704. In the particular example shown in FIG. 7, processor 702 may fetch, decode, and execute instructions 706-718 to provide VXLAN communication between the VMs.

As an alternative or in addition to retrieving and executing instructions, processor 702 may include one or more electronic circuits comprising a number of electronic components for performing the functionality of one or more of the instructions in machine-readable storage medium 704. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 704 may be any electronic, magnetic, optical, or other physical storage device that stores executable instructions. Thus, machine-readable storage medium 704 may be, for example, Random Access Memory (RAM), an Electrically-Erasable Programmable Read-Only Memory (EEPROM), a storage drive, an optical disc, and the like. Machine-readable storage medium 704 may be disposed within computing device 700, as shown in FIG. 7. In this situation, the executable instructions may be "installed" on the computing device 700. Alternatively, machine-readable storage medium 704 may be a portable, external or remote storage medium, for example, that allows computing device 700 to download the instructions from the portable/external/remote storage medium.

Referring to FIG. 7, instructions 706 when executed by processor 702, may cause processor 702 to deploy a service VM (i.e., VLAN-aware VM) on each of a plurality of hosts. Each host may execute VMs running therein. Instructions 708 when executed by processor 702, may cause processor 702 to execute a virtual bridge on each service VM.

Instructions 710 when executed by processor 702, may cause processor 702 to trunk VM ports associated with the VMs corresponding to each host into a logical port having a plurality of VLANs via respective virtual bridges. In one example, the VM ports associated with the VMs running on each host may be connected to a port group that spans across the hosts in a virtual computing environment. Further, the VM ports, corresponding to each host, from the port group may be trunked into the logical port having the plurality of VLANs via the respective virtual bridges.

Instructions 712 when executed by processor 702, may cause processor 702 to create a trunk port for each service VM. Instructions 714 when executed by processor 702, may cause processor 702 to create a sub-port for each of the VM ports that corresponds to the trunk port.

Instructions 716 when executed by processor 702, may cause processor 702 to establish a relationship between the sub-ports, the trunk ports, and network ports on VXLAN networks. In one example, each of the network ports on the VXLAN networks may be created, for a vNIC associated with the VMs, in the database for translating VLAN traffic to the VXLAN traffic in the VXLAN networks. In some examples, the trunk ports, the sub-ports, and/or the network ports may be created in accordance with a networking service (e.g., Neutron OpenStack) that delivers networking-as-a-service in a virtual computing environment.

Instructions 718 when executed by processor 702, may cause processor 702 to translate and redirect VXLAN traffic to/from the VMs using the established relationship and open flow rules via the respective virtual bridges. In one example, the VXLAN traffic may be redirected to/from the VMs via associated VTEPs provided by the service VMs using the established relationship and the open flow rules in the respective virtual bridges.

It may be noted that the above-described examples of the present solution are for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A management system comprising:
   a network service unit including a VXLAN networking module to:
      deploy a virtual local area network (VLAN)-aware virtual machine (VM) on each of a plurality of hosts, wherein each host executes VMs;
      execute a virtual bridge on each VLAN-aware VM;
      trunk VM ports associated with the VMs corresponding to each host into a logical port having a plurality of VLANs via respective VLAN-aware VMs;
      create a trunk port for each VLAN-aware VM in a database;
      create a sub-port for each VM port corresponding to the trunk port in the database; and
      communicate a unique identifier associated with the trunk port to respective virtual bridges; and
   a network controller to control each virtual bridge to translate and transmit virtual extensible local area network (VXLAN) traffic to/from the VMs using the trunk ports and the sub-ports.

2. The management system of claim 1, wherein the network controller is to establish a relationship between network ports on VXLAN networks, the sub-ports, and the trunk ports, wherein a network port is created, for each virtual network interface card (vNIC) associated with the VMs, in the database for translating VLAN tagged data to VXLAN encapsulated data in the VXLAN networks.

3. The management system of claim 2, wherein the network controller is to:
   apply open flow rules to the virtual bridges to translate the VXLAN traffic to/from the VMs; and
   route the VXLAN traffic to/from the VMs based on the established relationship and applied open flow rules via VXLAN tunnel endpoints (VTEPs) provided by the respective VLAN-aware VMs to carry the VXLAN traffic between the hosts in the VXLAN networks.

4. The management system of claim 1, wherein the VXLAN networking module is to create a new sub-port with a VLAN in an associated trunk port when a new VM is deployed on one of the hosts.

5. The management system of claim 1, wherein the network controller is to identify the VLAN-aware VM using the associated unique identifier.

6. The management system of claim 1, wherein the network controller comprises one of a software-defined network (SDN) controller and an open virtual network (OVN) driver, and wherein the virtual bridge comprises an open virtual switch (OVS) bridge.

7. The management system of claim 1, further comprising:
   a VLAN agent to assign a VLAN identifier for each VM port corresponding to each host.

8. The management system of claim 1, wherein the VLAN-aware VM is a VM that transmits and/or receives VLAN tagged data via associated vNICs.

9. A method comprising:
   receiving, by a first virtual bridge on a first virtual local area network (VLAN)-aware virtual machine (VM) running on a first host, a VLAN tagged packet from a first VM running on the first host via a port group that spans across hosts;
   translating, by the first virtual bridge, the VLAN tagged packet from the first VM to a virtual extensible local area network (VXLAN) encapsulated packet based on a network property of a VM port of the first VM; and
   transmitting, by the first virtual bridge, the VXLAN encapsulated packet to a second VM running on a second host via a VXLAN tunnel endpoint (VTEP) provided by the first VLAN-aware VM.

10. The method of claim 9, wherein the VM port associated with the first VM is connected to the port group that spans across the hosts in a virtual computing environment.

11. The method of claim 9, further comprising:
    creating a trunk port to represent a logical trunk for the first VLAN-aware VM on the first host, wherein the logical trunk is to allow VLANs and deliver VLAN tagged packets from VM ports to the first virtual bridge;
    creating a sub-port having an associated private VLAN for each VM port corresponding to the trunk port; and
    mapping the sub-ports and the trunk port with network ports on VXLAN networks.

12. The method of claim 11, further comprising:
    programming open flow rules in the first virtual bridge based on the sub-ports and the private VLANs by a network controller, wherein the VLAN tagged packet from the first VM is translated to the VXLAN encapsulated packet based on the mapping and the programmed open flow rules.

13. The method of claim 12, wherein the open flow rules are programmed in the virtual bridge in compliance with an open virtual switch database (OVSDB) management protocol.

14. The method of claim 9, further comprising:
    executing a second VLAN-aware VM on the second host;
    translating, by a second virtual bridge on the second VLAN-aware VM, the VXLAN encapsulated packet to the VLAN tagged packet; and
    transmitting the translated VLAN tagged packet to the second VM.

15. A non-transitory machine-readable storage medium encoded with instructions that, when executed by a processor, cause the processor to:
    deploy a service virtual machine (VM) on each of a plurality of hosts, wherein each host executes VMs running therein;
    execute a virtual bridge on each service VM;
    trunk VM ports associated with the VMs corresponding to each host into a logical port having a plurality of virtual local area networks (VLANs) via respective virtual bridges;
    create a trunk port for each service VM;

create a sub-port for each of the VM ports that corresponds to the trunk port;
establish a relationship between the sub-ports, the trunk ports, and network ports on virtual extensible local area network (VXLAN) networks; and
translate and transmit VXLAN traffic to/from the VMs using the established relationship and open flow rules via the respective virtual bridges.

16. The non-transitory machine-readable storage medium of claim 15, wherein each of the network ports on the VXLAN networks is created, for a virtual network interface card (vNIC) associated with the VMs, in a database for translating VLAN traffic to the VXLAN traffic in the VXLAN networks.

17. The non-transitory machine-readable storage medium of claim 15, wherein the VXLAN traffic is redirected to/from the VMs via associated VXLAN tunnel endpoints (VTEPs) provided by the service VMs using the established relationship and the open flow rules in the respective virtual bridges.

18. The non-transitory machine-readable storage medium of claim 15, further comprising instructions to:
connect the VM ports associated with the VMs running on each host to a port group that spans across the hosts in a virtual computing environment, wherein the VM ports, corresponding to each host, from the port group are trunked into the logical port having the plurality of VLANs via the respective virtual bridges.

* * * * *